(12) United States Patent
McAuliffe

(10) Patent No.: US 8,154,519 B2
(45) Date of Patent: *Apr. 10, 2012

(54) ERGONOMIC HAND-HELD COMPUTER INPUT AND CONTROL DEVICE

(76) Inventor: Gregory S McAuliffe, Los Gatos, CA (US)

( * ) Notice: Subject to any disclaimer, the term of this patent is extended or adjusted under 35 U.S.C. 154(b) by 1008 days.

This patent is subject to a terminal disclaimer.

(21) Appl. No.: 11/863,162

(22) Filed: Sep. 27, 2007

(65) Prior Publication Data

US 2008/0129687 A1 Jun. 5, 2008

Related U.S. Application Data

(63) Continuation of application No. 10/840,573, filed on May 5, 2004, now Pat. No. 7,292,224.

(60) Provisional application No. 60/509,266, filed on Oct. 8, 2003, provisional application No. 60/468,277, filed on May 6, 2003.

(51) Int. Cl.
*G09G 5/00* (2006.01)

(52) U.S. Cl. ........................................ 345/169; 345/156

(58) Field of Classification Search ........... 345/156–161
See application file for complete search history.

(56) References Cited

U.S. PATENT DOCUMENTS

| | | | | | |
|---|---|---|---|---|---|
| 5,512,892 | A | * | 4/1996 | Corballis et al. | 341/22 |
| 5,805,256 | A | * | 9/1998 | Miller | 348/734 |
| 6,164,853 | A | * | 12/2000 | Foote | 400/489 |
| 6,892,481 | B2 | * | 5/2005 | Yamamoto et al. | 37/348 |
| 7,292,224 | B2 | * | 11/2007 | McAuliffe | 345/161 |
| 2001/0045938 | A1 | * | 11/2001 | Willner et al. | 345/156 |
| 2002/0075233 | A1 | * | 6/2002 | White et al. | 345/161 |
| 2003/0090456 | A1 | * | 5/2003 | Lin | 345/156 |
| 2003/0107551 | A1 | * | 6/2003 | Dunker | 345/158 |
| 2003/0142069 | A1 | * | 7/2003 | Gatto et al. | 345/156 |
| 2003/0179178 | A1 | * | 9/2003 | Zargham | 345/156 |
| 2004/0155865 | A1 | * | 8/2004 | Swiader | 345/161 |

* cited by examiner

*Primary Examiner* — Nitin Patel

(74) *Attorney, Agent, or Firm* — Buchanan Ingersoll & Rooney LLP

(57) ABSTRACT

A hand-held computer input and control device designed to be held in the palm of a relaxed free floating hand, wherein the device is balanced for use with the user's thumb, $1^{st}$ and/or $2^{nd}$ fingers. In one exemplary embodiment, a hand held structure having general radial symmetry, for use in multi-button three dimensional computer control applications, consisting of a mushroom like head with multiple buttons placed such that the thumb, first, or second fingers can easily control them, and a separate cylindrical body with two grooves and optional buttons positioned for grasping by the third and fourth fingers is provided.

22 Claims, 6 Drawing Sheets

ERGONOMIC HAND-HELD COMPUTER INPUT AND CONTROL DEVICE

RELATED APPLICATION

The present application claims priority under 35 U.S.C. Section 119 to U.S. Provisional Patent Applications Nos. 60/509,266; filed Oct. 8, 2003, and 60/468,277; filed May 6, 2003, the complete disclosures of which are incorporated herein by reference in their entirety for all purposes.

FIELD OF INVENTION

The invention presented is related in general to computer input and control devices, and in particular to hand-held input and control devices.

BACKGROUND OF THE INVENTION

In the early days of computer the input and output was either in the form of numbers or text. The primary input devices were teletypewriters and punched card readers. As computing became better and cheaper, graphical user interfaces were developed, and along with them an interactive input controller called the mouse. The mouse is a hand held device with one or more click buttons and usually a ball and x/y rod assembly that tracks movement on a plane, typically the surface of a desk. Since the original design, there have been numerous variations of the mouse. Some are used palm down like the first mouse, but many versions are utilized with the hand in a "thumb up" position such as those described in U.S. Pat. No. 5,355,147 to Lear, and U.S. Pat. No. 5,894,303 to Barr.

Recently computing has become so much better and cheaper that interactive three-dimensional graphics has become commonplace. Computer graphics coupled with stereographic output devices and three-dimensional "gloves" has led to a branch of interactive computer graphics called Virtual Reality. Glove technology uses a combination of finger switches or buttons along with flexion sensors and a three-dimensional position sensor, generally placed on the back of the hand, such as described in U.S. Pat. No. 6,515,669 to Mohri, and U.S. Pat. No. 5,764,164 to Cartabiano.

The problem with such devices is related to their structure. When people use gloves on their hands in warm surroundings their hands will tend to perspire. The insides of the gloves get wet. The combination of water and constant movement tends to wear out the gloves' finger sensors. Gloves are also right and left handed, so for applications that require two hands, two different gloves must be manufactured, whereas some types of mouse like controllers are ambidextrous such as in U.S. Pat. No. 6,072,471 to Lo. Furthermore, unlike a mouse, which can just be temporarily left on a surface when not in use, gloves must be physically taken off when temporarily suspending computer operations.

SUMMARY OF THE INVENTION

The present invention provides a hand-held computer input and control device, comprising: a body configured to be held in the palm of a relaxed free floating hand; and a plurality of manual controls disposed on the body for operation by a user's thumb and at least one of the user's fingers, in various aspects, the plurality of manual controls are positioned for use by a user's thumb and $1^{st}$ finger, and optionally $2^{nd}$ finger while the user's $3^{rd}$ and $4^{th}$ fingers are wrapped around the body of the device.

The body of the device may be shaped to contact the user's hand with the user's fingers being curled progressively tighter from the $1^{st}$ to $4^{th}$ finger of the hand. For example, the body of the device has a generally tapered shape. In optional embodiments, the body of the device is generally symmetrical about a central vertical axis extending therethrough.

In one aspect, the body has a top portion and a bottom portion. The top portion may be generally mushroom or hemispherical shaped, and the plurality of manual controls are disposed on the top portion. The bottom portion may be generally conical in shape. Optional finger grooves may be provided, for the $3^{rd}$ and $4^{th}$ fingers.

An advantage of the present invention is that it may be balanced to be held and operated with a thumb and one finger, or with only two fingers. Opposable thumb pressure is not required due to the edge of the top portion contacting the palm.

Optional position sensing equipment may be provided to sense the location or orientation, or both, of the device.

In preferred aspects, the device is adapted to control a two-dimensional or three-dimensional cursor on a monitor of a computer.

In preferred aspects, a pair of devices may be provided (with one configured for operation in the user's left hand and the other in the user's right hand).

In preferred aspects, the present invention provides an input and control device having the advantages of three dimensional capability of a glove like input device with the rugged ease of use of a mouse in a comfortable ergonomic style. Further benefits of the present input and control device are its being ergonomic. For example, the present device fits comfortably into a user's hand, regardless of the position and orientation of the user's hand in space. Thus, the present device is balanced in the user's hand, such that it can be operated easily in different orientations in space.

In one preferred embodiment, the present invention is a hand-held structure with radial symmetry, shaped to fit naturally into a human hand, for use in multi-button three dimensional computer control applications. Such embodiment may optionally comprise two portions, being a mushroom-like top portion with multiple buttons, or other manual controls, placed such that the thumb, $1^{st}$, or $2^{nd}$ fingers can easily control them, and a separate cylindrical lower portion with two optional grooves positioned for grasping by the third and fourth fingers. The two portions snap or screw together into a single device 100 shown in FIG. 1. The whole assembly of the device may be hollow to provide space for optional positional electronics, or other application-specific hardware, button assemblies and computer interface wire, which exits near the bottom of the device.

DESCRIPTION OF PREFERRED EMBODIMENTS

Figure 1:
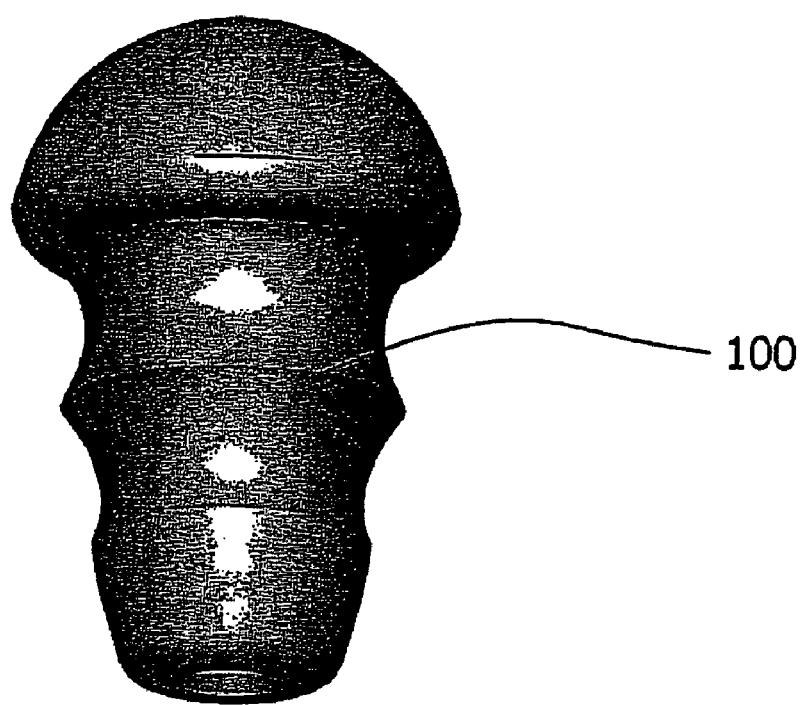
FIG. 1 is a drawing of shape of an assembled device according to the present invention.
Figure 2:
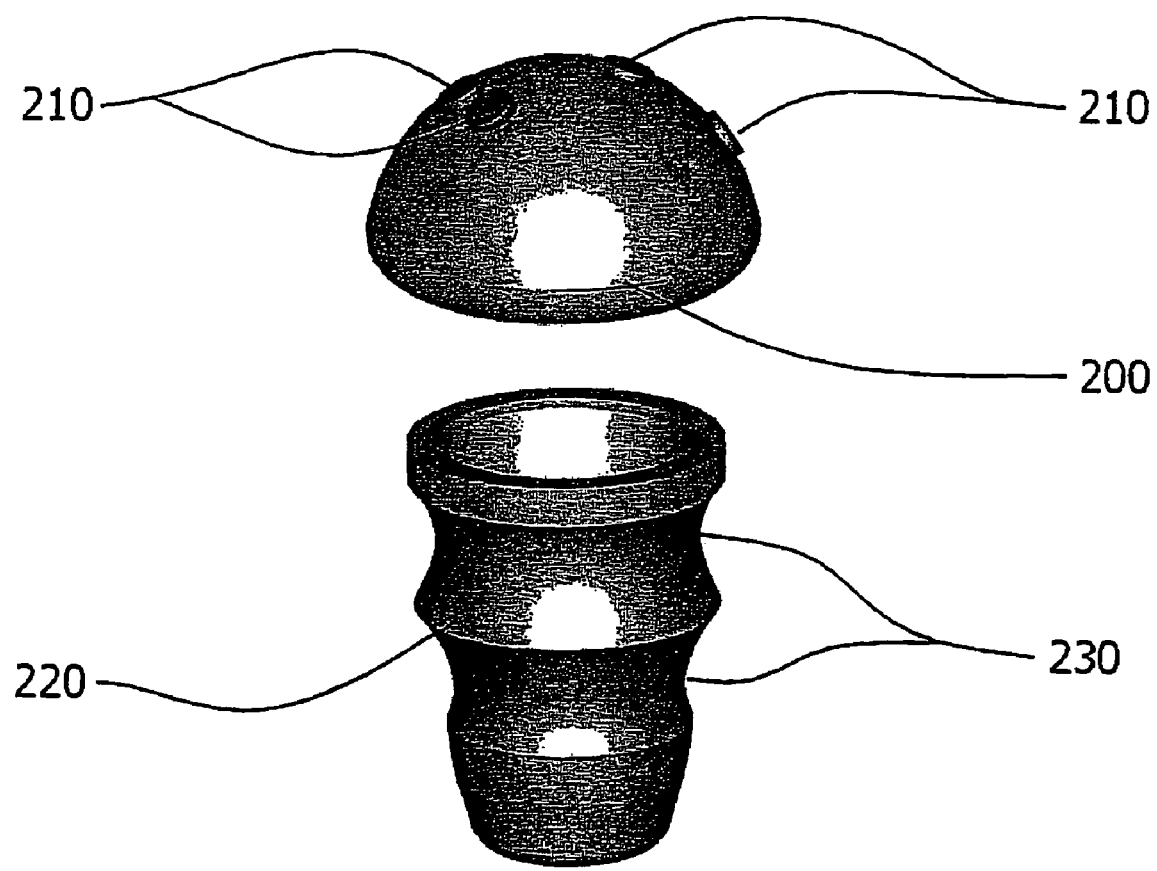
FIG. 2 is a drawing of a mushroom-shaped top portion (i.e. the "head") of the device separated from the cylindrical body of the device.
Figure 3:
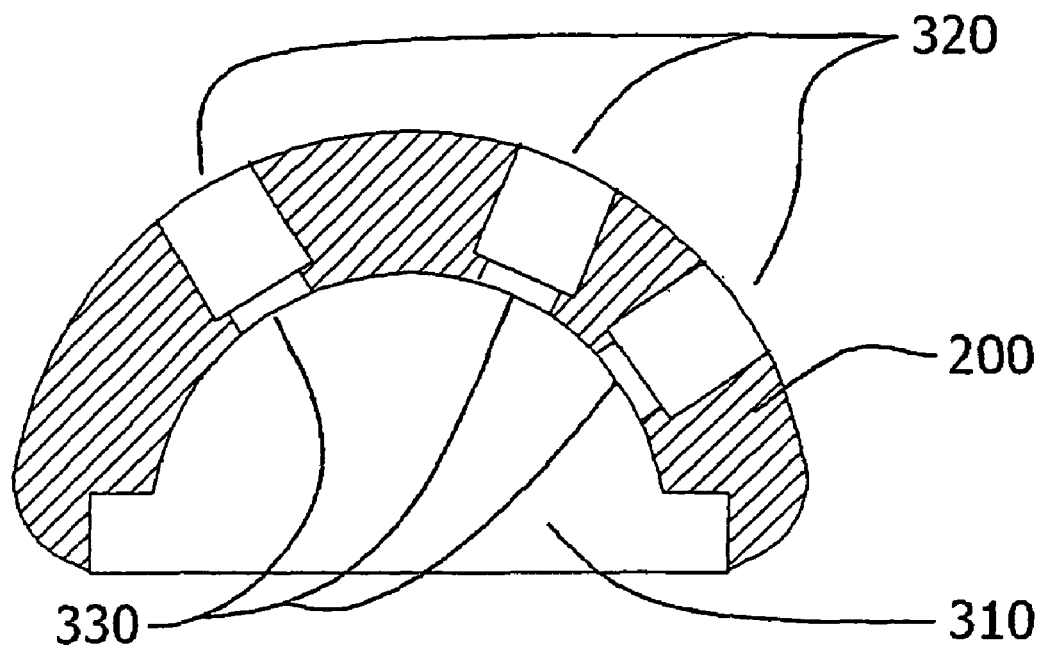
FIG. 3 is a cross section of the mushroom-shaped top portion.
Figure 4:
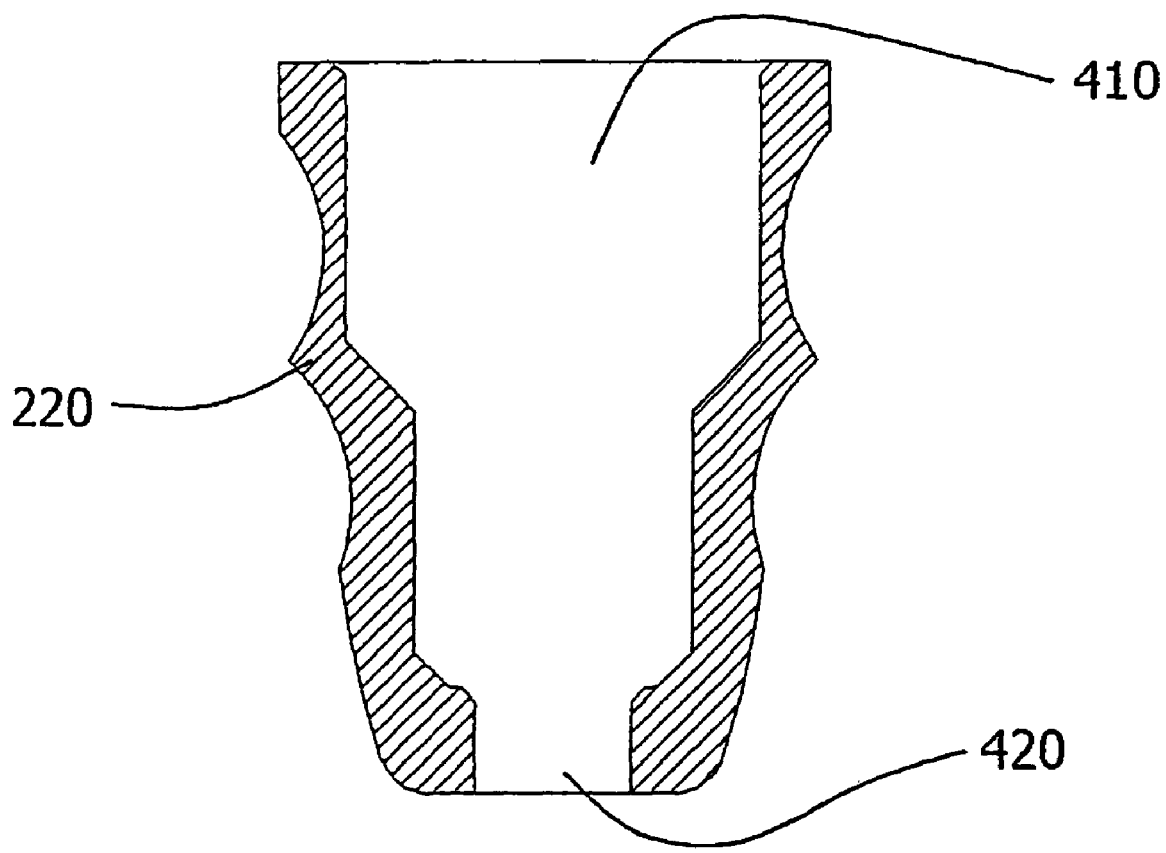
FIG. 4 is a cross section of the cylindrical bottom portion.

A preferred embodiment of the invention is comprised of two portions, as shown in FIG. 2. A mushroom-shaped head 200 with multiple buttons 210 is provided such that the thumb, $1^{st}$, or $2^{nd}$ fingers can easily control them, and a separate bottom portion 220 with two grooves 230 positioned for grasping by the third and fourth fingers. The mushroom shaped top portion 200 as shown in cross section in FIG. 3, has a hollow cavity 310 with counter-bores 320 to insert switches into, and small-drilled holes 330 to pass the signal from the switches. The bottom portion 220 may optionally be cylindrical as shown in cross section in FIG. 4 with a hollow cavity 410 that is tapered to insure sidewall integrity, down to a small hole 420 for the connection (by cable or antenna) to a computer.

In various embodiments, buttons 210 (or 710 in FIG. 7) may be simple on-off switches, but they may also be alternate switches or controllers including trackballs, joysticks, etc. Buttons/switches 210 or 710 may be controlled/actuated by the user's thumb, $1^{st}$ and/or $2^{nd}$ fingers. In various embodiments, buttons/switches 210 or 710 may optionally be controlled/actuated by the user's $3^{rd}$ and possibly $4^{th}$ fingers.

The shape of the combined assembly is designed to fit naturally into a hand at rest. The most natural shape of a hand at rest is with the fingers progressively more curled from the first or pointer finger slightly bent to the $4^{th}$ or pinky finger most curled, as can be seen in photographs of astronauts in zero gravity sleep. The device is small and light enough to be held securely in place by only the $3^{rd}$ or ring finger and the $4^{th}$ or pinky finger when they are curled around the cylindrical body in the two grooves.

Thus, the body of the present invention is ergonomically shaped or configured to be held in the palm of a relaxed, free floating hand. As understood herein, a "relaxed, free floating hand" is understood to mean a hand in which the user's fingers are curled progressively tighter from the $1^{st}$ to $4^{th}$ finger of the hand.

As can be seen herein, top portion 200 may be mushroom-shape or hemispherical-shaped (including any generally curved section or surface as found in a section of the surface of a sphere). As can also be seen, device 100 may be generally symmetrical about a central vertical axis extending through the device. The present invention is not so limited. Rather, ergonomic shaped design in which the device is balanced for use in the operator's hand is contemplated. As can also be seen, the device may be cylindrical, tapered or conical in shape. Again, the present invention is not so limited. Preferably, however, device 100 is shaped such that a user is able to activate at least one of the manual controls with their $1^{st}$ and/or $2^{nd}$ fingers, without having to provide a counter pressure on the device with their thumb. As well, device 100 may be shaped such that a user is able to activate at least one of the manual controls with their thumb, $1^{st}$ and/or $2^{nd}$ fingers.

Figure 5:
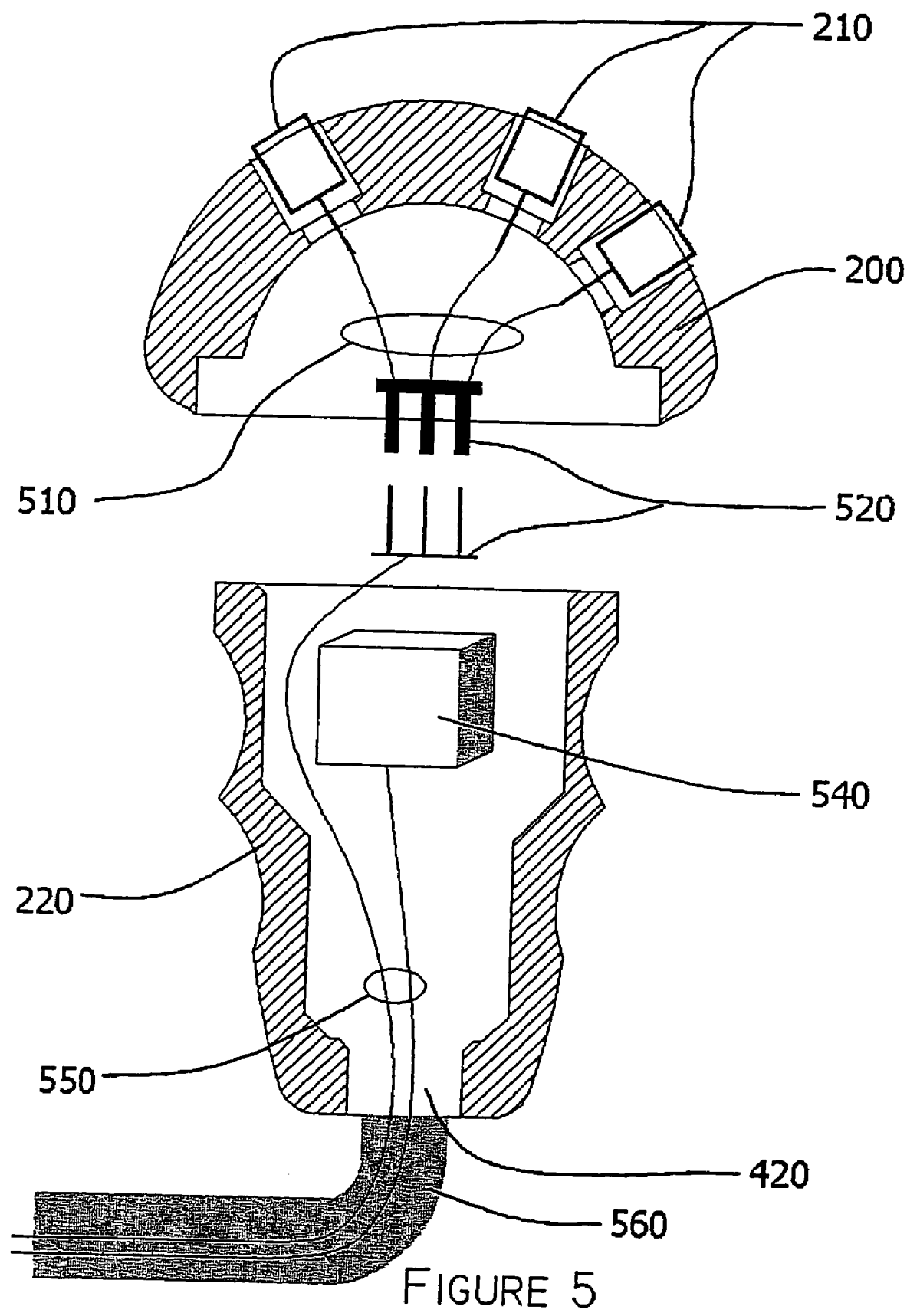
FIG. 5 is a cross section diagram of an assembled device.

FIG. 5 is a cross section of the device with optional, preferred electronics included. The wires 510 from the switches 210 in the mushroom head 200 are connected to a connector 520 which makes connection with a corresponding connector 520 in the body when the two pieces 200, 220 are snapped together. The positional electronics 540 is housed below the connector in the cavity of the body 220. Optional positional electronics 540 may be used to sense either or both of the device's location or its orientation in space. Wires from the connector and the positional electronics 550 thread through the hole 420 into a cable 560 that connects the assembly to a computer.

In alternate embodiments, various other electronic systems and components may be positioned within the device. For example, electronic systems that provide various forms of feedback may be included. In a first example, tactile feedback systems may be included. Such tactile feedback systems may include systems that cause to the body or buttons of the device to vibrate, or to produce a short pulsed vibration such that that device will momentarily "tick" or "jerk" This may be beneficial when alerting a user that an on-screen cursor has punctured an on-screen object. In a second example, audio feedback systems may also be included. For example, the device may include vibration transducers capable of transmitting a wide range of audio frequencies from discrete "clicks" or "taps" speaker(s) that "beep" when desired to systems capable of producing voice, music or any other sound. In one embodiment, such audio transducers may emit a sound of varying pitch, with the pitch correlating to on-screen movement, such as distance traveled. For example, the pitch may increase (or decrease) as on-screen objects are stretched, pulled apart, or moved around. In a third example, visual feedback systems may be included. Examples of such systems include systems configured to illuminate the body or buttons/switches of the device. Thus, various tactile, audio and visual feedback systems are contemplated, all keeping within the scope of the present invention.

Figure 6:
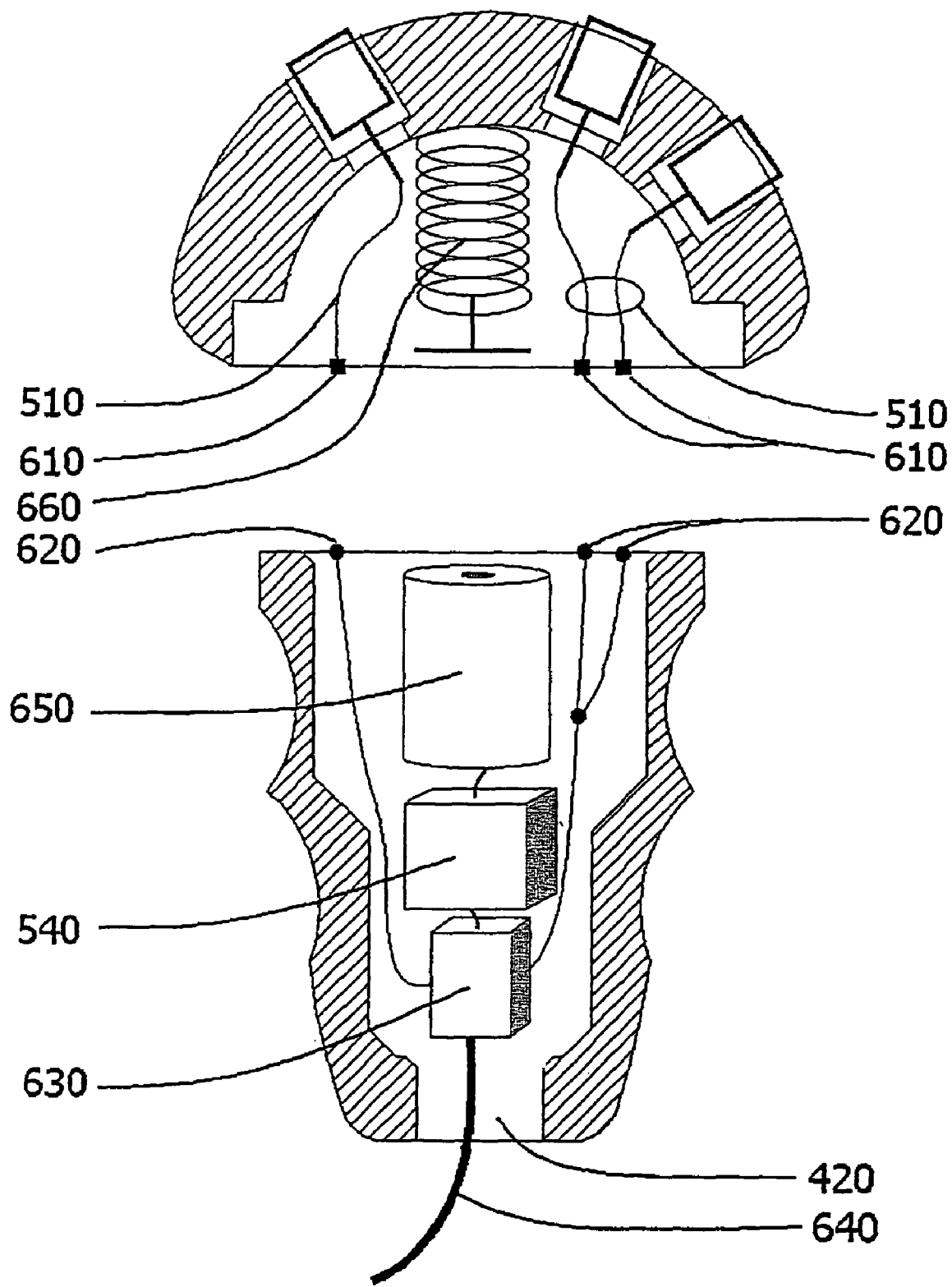
FIG. 6 is a cross section diagram of an assembled wireless device.

In another embodiment as shown in FIG. 6, the switch control wires 510 connect to connectors 610 on the inner edge of the mushroom head, which in turn connect to connectors 620 on the inner edge of the cylindrical body 220 such that the connections are made when the mushroom head is screwed or snapped onto the body. The positioning electronics 540 and the wires from the buttons are all connected to a wireless transponder 630, which in turns interfaces with a computer via wireless communication technology transmitted over an antenna 640 that may extend out the hole 420 at the bottom of the body. Replaceable or rechargeable batteries, or other energy storage devices, 650 to power the electronics are housed above the electronics. Spring driven metal connector (s) 660 in the mushroom-like top portion insure the batteries make good contact.

It is to be understood that the particular shape of the present invention illustrated in FIGS. 1 to 6 is merely exemplary, and is not limiting. Consequently, alternate shapes for the body of the present invention may be used instead. For example, the body of the device may be non-symmetrical, having both left-handed and right-handed versions. Alternately, the body of the device may be shaped, like a pistol grip. Such a pistol grip embodiment may have optional finger grooves oriented diagonally (instead of perpendicular) to the body's main axis.

Figure 9:
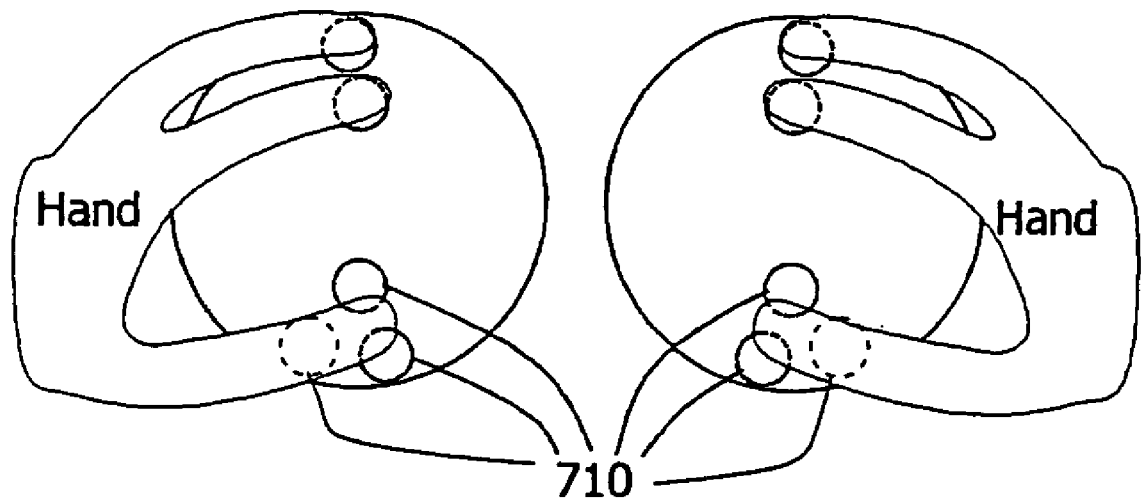
FIG. 9 is an illustration of an embodiment of the invention having a triangular (i.e.: ambidextrous) button pattern that can be used by either hand.

It is to be understood that the particular button/actuator configuration illustrated herein is merely exemplary. In optional embodiments, an ambidextrous button configuration may be used instead, such that the device may be used equally well by a user's left and right hands. Such an ambidextrous button configuration is shown in FIG. 9.

Figure 10:
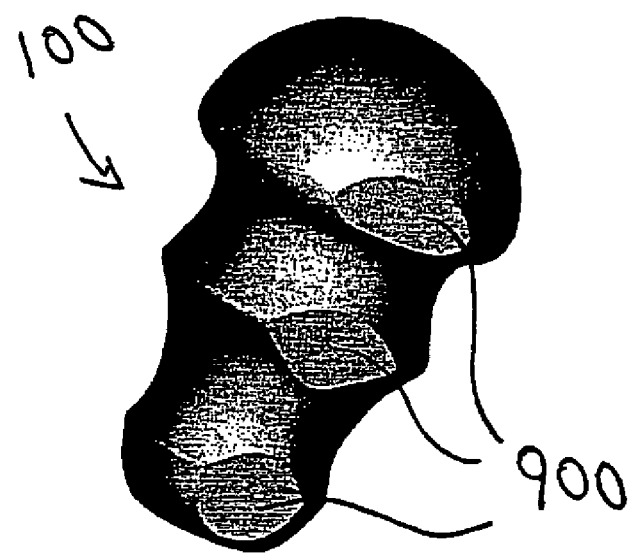
FIG. 10 is an illustration of an embodiment of the invention having a flat surface such that it will not roll around when placed on a flat surface.

In further optional embodiments, the body of the device may have a flat surface(s) such that when placed on a table, it will not roll around. Such a flat surface 900 is shown in FIG. 10.

In optional embodiments, head 200 may also have grooves or indentations therein for receipt of the user's thumb, $1^{st}$ and/or $2^{nd}$ fingers.

In optional embodiments, bottom portion 220 may be made from two pieces that are assembled together. This may facilitate manufacturing and servicing, allow easier installation of electronics therein and permit a wider variety of materials to be used.

In yet another embodiment the batteries may be rechargeable by placing the controller in a charger.

Figure 7:
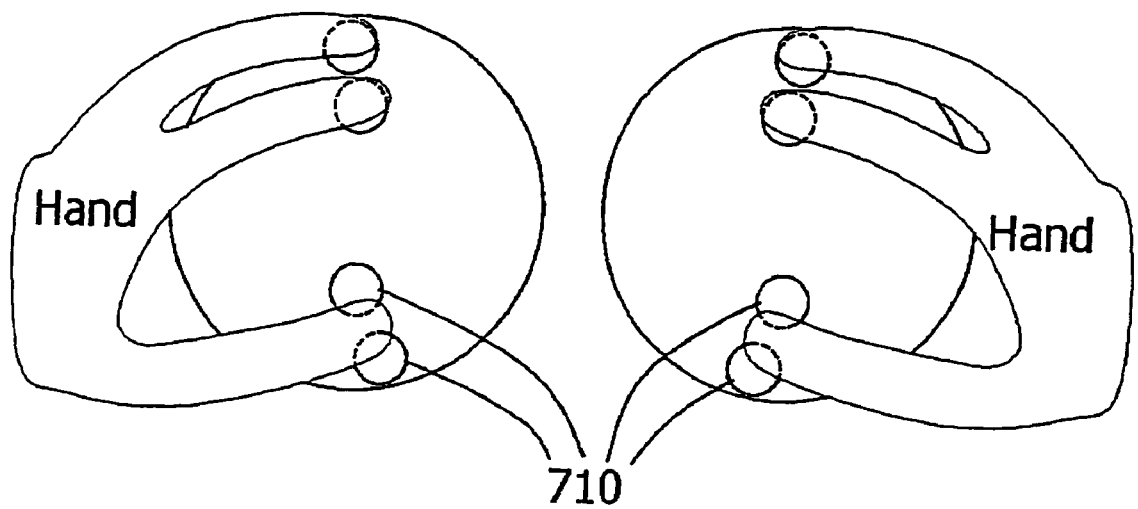
FIG. 7 are top views of mushroom-shaped top portions for left and right hand placements.

In yet another embodiment the same body can be used with top portions that have different button placement either for different sized hands or for left and right hands as shown in FIG. 7.

In yet another embodiment, because traditional milling equipment may be used to form the components of this invention, it may be milled out of wood, or some other non-liquid molded materials.

In yet another embodiment, the body of the present invention may be formed by injection molding plastic. An advantage of injection molding is that it is very cost effective.

In yet another embodiment, as shown in FIG. 7, multiple buttons 710 may be placed in adjacent positions for selection by the thumb.

Figure 8:
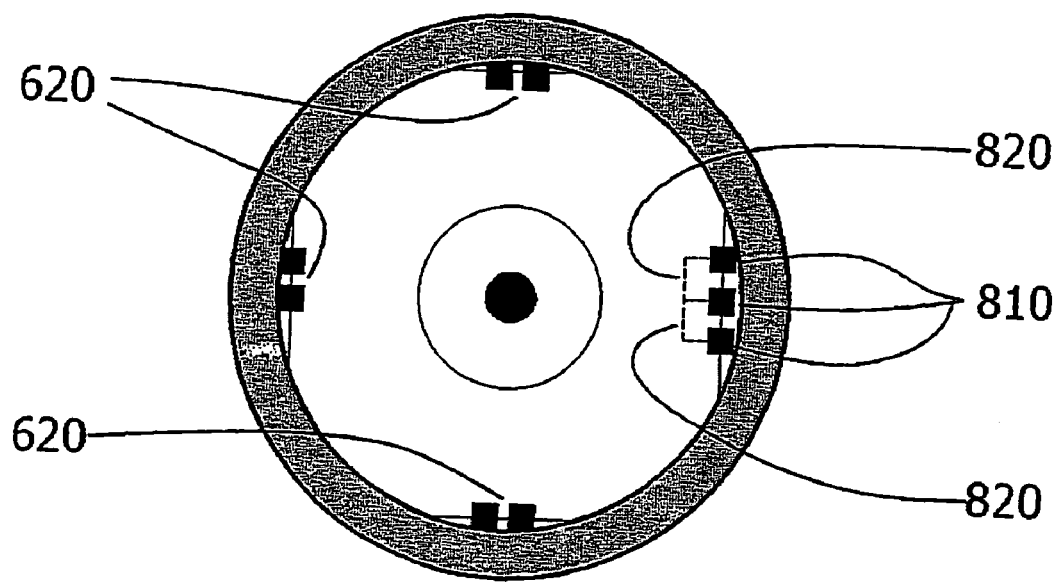
FIG. 8 is a top view of the cylindrical bottom portion.

In yet another embodiment as shown in FIG. 8, separate connectors 810 may be wired together with different jumper wires 820 inside the mushroom head to identify the type of controller when multiple controllers are used with a single computer.

In yet another optional embodiment the bottom of the device can be connected to a base for use as a joy stick.

In yet another embodiment the switches may include, but are not limited to push button electrical switches, directional force sensing controls or pneumatic force sensing controls.

In yet another embodiment the controller may be used to control the placement of a two or three-dimensional cursor on a computer screen.

In yet another embodiment, to alleviate overheating of power dissipating internal electronics, additional holes may be drilled into the head or body in locations where the fingers are not placed to provide air flow to the electronic components, or a heat sink may be added to the assembly and either extended out the bottom hole or extended out some other hole that is added where the fingers would not normally be touching the body.

In optional embodiments, one or more of buttons 210 or 710 may be illuminated. Alternately, or in addition, the body of the device may be illuminated, or include glow-in-the-dark materials.

In further optional embodiments, the body of the device, or buttons 210 or 710 thereon, may be made to vibrate, or provide some other form of tactile feedback.

The present invention may optionally include a set of batteries, a wireless transponder, wires connecting said manual controls and said sensing equipment to said transponder and an antenna, for communicating with a computer.

What is claimed is:

1. A hand-held control device, comprising:
   a body configured to be held in the palm of a relaxed free floating hand, the body having a top portion that is generally hemispherical in shape, and a bottom portion; and
   a plurality of manual controls disposed on the top portion of the body for operation by a user's thumb and at least one of the user's $1^{st}$ and $2^{nd}$ fingers, and wherein the user's $3^{rd}$ and $4^{th}$ fingers are wrapped around the bottom portion of the device.

2. The device of claim 1, wherein the plurality of manual controls disposed on the top portion of the body for operation by the user's thumb and the user's $1^{st}$ and $2^{nd}$ fingers.

3. The device of claim 1, wherein the bottom portion has at least two grooves positioned for grasping by the user's $3^{rd}$ and $4^{th}$ fingers and is shaped to the user's hand, and wherein the user's fingers are curled progressively tighter from the $3^{rd}$ finger to the $4^{th}$ finger of the hand.

4. The device of claim 1, wherein the bottom portion is shaped to conform to the lower portion of the user's hand, and wherein the user's fingers are wrapped around the bottom portion.

5. The device of claim 1, wherein the top portion is generally hemispherical in shape.

6. The device of claim 1, wherein the top portion is generally spherical in shape.

7. The device of claim 1, wherein the top portion is generally spherical in shape with a flattened area to accommodate an array of switch actuators.

8. The device of claim 1, wherein the $3^{rd}$ finger is positioned in reduced cross-sectional area or channel-like reduction, specifically located below the top portion to allow the user to securely retain the device without aid from the other fingers, thereby allowing complete, independent, and non-opposable freedom of movement of the thumb, $1^{st}$, and/or $2^{nd}$ fingers, to actuate the controls; and
   wherein the bottom portion is configured such that its cross-section perpendicular to its longitudinal axis, is tapered to fit comfortably in the lower palm of the hand.

9. The device of claim 1, wherein the device is configured such that a user is able to activate at least one of the manual controls with their $1^{st}$ or $2^{nd}$ fingers, without having to provide a counter pressure on the device with their thumb.

10. The device of claim 1, wherein the device is configured such that a user is able to activate at least one of the manual controls with either of their $3^{rd}$ or $4^{th}$ fingers.

11. The device of claim 1, wherein the body of the device has a generally tapered shape.

12. The device of claim 1, wherein the device is shaped to contact the user's hand with the user's fingers being curled progressively tighter from the $3^{rd}$ to $4^{th}$ finger of the hand.

13. The device of claim 1, wherein the body of the device is generally symmetrical about a central vertical axis extending therethrough.

14. The device of claim 1, wherein the bottom portion is generally conical in shape.

15. The device of claim 1, wherein a horizontal cross-section of the bottom portion is generally elliptical in shape.

16. The device of claim 1, wherein a horizontal cross-section of the bottom portion is shaped to conform to the lower portion of the hand.

17. The device of claim 1, wherein the top portion can be removed from the bottom portion of the device such that differently configured top portions can be interchanged with the bottom portion of the device.

18. The device of claim 1, further comprising:
   a stand connected to the bottom of said body such that the device may be operated as a joystick.

19. The device of claim 1, further comprising:
   a flat surface disposed on the body of the device to prevent the device from rolling when placed on a flat surface.

20. A hand-held computer input and control device, comprising:
   a body configured to be held in the palm of a relaxed free floating hand, the body having a top portion that is generally hemispherical in shape, and a cylindrical bottom portion; and a plurality of openings in the generally hemispherical top portion of the body, the openings being adapted to receive a plurality of manual controls disposed on the top portion of the body for operation by a user's thumb and $1^{st}$ and $2^{nd}$ fingers.

21. The device of claim 20, wherein the $3^{rd}$ finger is positioned in a reduced cross-sectional area specifically located below the top portion to allow the user to securely retain the device without aid from the other fingers, thereby allowing complete, independent, and non-opposable freedom of movement of the thumb, $1^{st}$, and $2^{nd}$ fingers, to actuate the controls; and wherein the bottom portion configured such that a groove for the $4^{th}$ finger is wrapped at a reduced radius relative to the $3^{rd}$ finger and whose horizontal cross-section is generally circular.

22. The device of claim 21, further comprising:

the plurality of manual controls disposed within the openings in the body.

* * * * *